2,813,095

SPIROSTAN-3α-ol-12-ONE AND 22-ISOPIROSTAN-3α-ol-12-ONE

Carl Djerassi, Birmingham, Mich., and George Rosenkranz, Mexico City, Mexico, assignors, by mesne assignments, to Syntex S. A., Mexico City, Mexico, a corporation of Mexico No Drawing. Application February 6, 1953, Serial No. 335,584

Claims priority, application Mexico February 13, 1952

2 Claims. (Cl. 260—239.55)

The present invention relates to novel cyclopentanophenanthrene derivatives and to a novel method for the preparation thereof. More particularly the present invention relates to novel steroidal sapogenin derivatives having a keto group at position 12 and especially of normal configuration at C-5 as well as to the preparation of novel intermediates for the preparation of these last mentioned compounds.

It is known that the 12-keto steroidal sapogenins which occur naturally such as hecogenin are valuable starting materials for the preparation of cortisone and of other steroids oxygenated at position 11 of the molecule. Thus, in the Journal of the American Chemical Society, 73, page 5513 (1951), there is disclosed a method whereby there is produced from hecogenin 22-isoallospirostan-3β-ol-11-one. In other words, a steroid similar to hecogenin but with the oxygen function at the C-11 position. It is also pointed out in the aforementioned article that 22-isoallospirostan-3β-ol-11-one had already been transformed into allopregnane-3β-ol-11,20-dione and from this last mentioned compound to cortisone. However, all of the known natural sapogenins having an oxygen function at C-12 either belong to the allo series (at C-5) or have a double bond between C-5 and C-6. For the preparation of adrenal hormones oxygenated at C-11, it would be advantageous to have as a starting material a sapogenin having the normal configuration at C-5 since starting with this type of material the same steps could be perfomed to produce an equivalent normal pregnane compound, and this pregnane compound could be more easily provided with the ring A structure characteristic of cortisone and certain other of the adrenal hormones since monobromination of a normal pregnane compound followed by dehydrobromination produces the double bond in position 4, 5.

In accordance with the present invention, therefore, there has been provided a novel process for the production of certain novel intermediates for the production of C-5 normal sapogenins having an oxygen function at C-12, such as for example 22-isospirostan-3α-ol-12-one, which in turn is a valuable intermediate for the production of 11-oxygenated adrenal cortical hormones as will be hereinafter set forth in detail.

There has also been discovered in accordance with the present invention a novel process for and novel intermediates for the production of the aforementioned compound, such as 22-isoallospirostan-3,12-dione compounds, having iodo and bromo substituents at positions 2 and 23, as well as in the 4 position. There has also been discovered in accordance with the present invention other novel spirosten compounds having double bonds at the Δ⁴ as well as the Δ³,⁵ positions.

The following equation serves to illustrate in part the present invention:

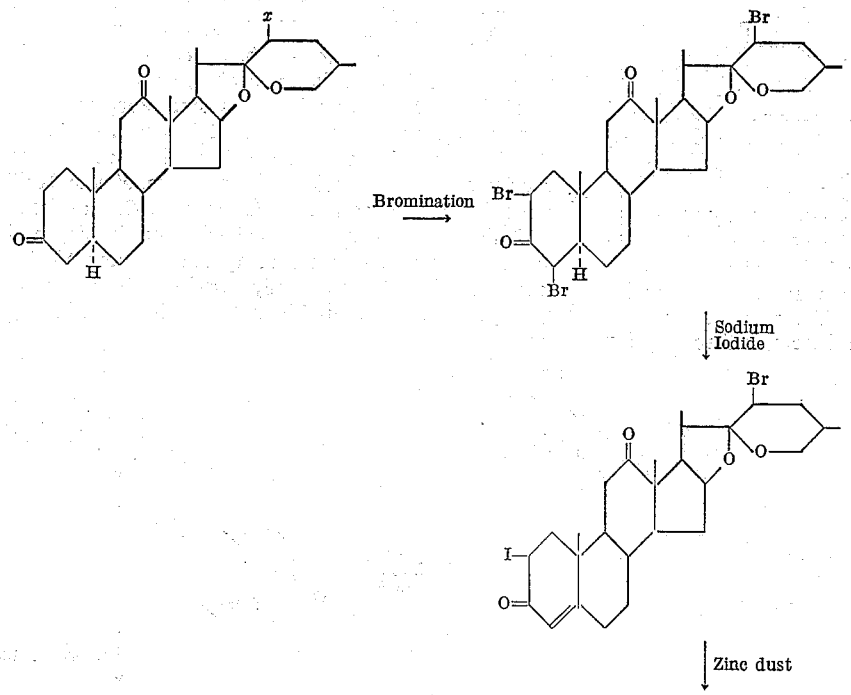

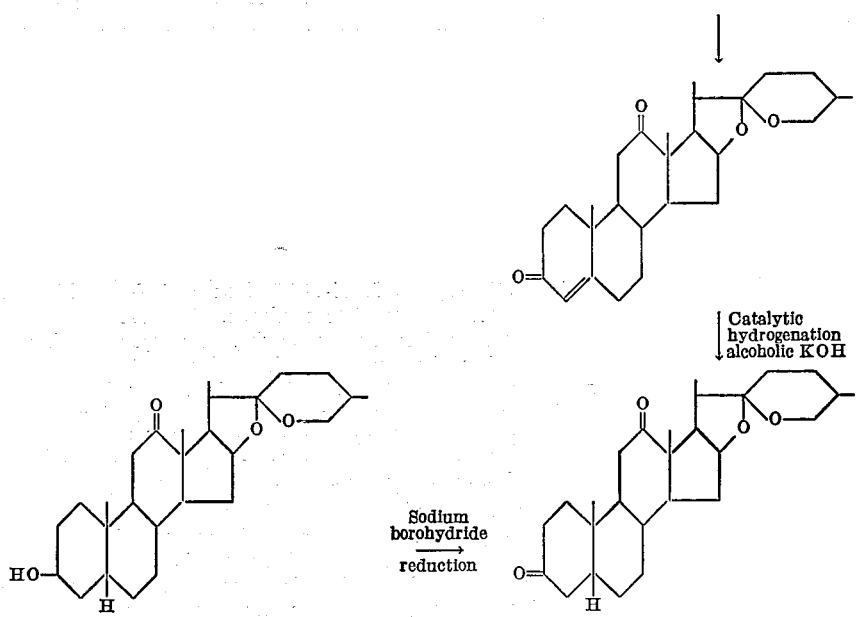

In the above equation X may be hydrogen or bromine. In the case where X is hydrogen the starting material is the known compound 22-isoallospirostan-3,12-dione which is readily derived from hecogenin or rockogenin by chromic acid oxidation. When X is bromine the starting compound is a new intermediate 23-bromo-22-isoallospirostan-3,12-dione which is derived as set forth hereinafter by chromic acid oxidation of the known compound 23-bromo-22-isoallospirostan-3β-ol-12-one (23 - bromohecogenin).

As will be noted the final compound indicated above is 22-isospirostan - 3α - ol - 12 - one which is an extremely valuable intermediate for the production of cortisone since in accordance with the method disclosed in J. A. C. S. 73, page 5513 there may be prepared therefrom 22-isospirostan-3α-ol-11-one which may be oxidatively degraded followed by saturation of the $\Delta^{16}$ double bond by known methods for degradation of the sapogenin side chain (Fieser and Fieser, Natural Products Related to Phenanthrene, third edition, pages 589 and 590) to pregnane-3α-ol-11, 20-dione. This last compound is a known intermediate for the production of cortical hormones. For example 11-dehydrocorticosterone may be prepared from this last mentioned compound by the method shown as applied to the 3β isomer in Fieser and Fieser, Natural Products Related to Phenanthrene, third edition, page 445.

The first step of the process outlined in the foregoing equation may be practiced in general by dissolving a suitable sapogenin such as 23-bromo-22-isoallospirostan-3,12-dione or 22-isoallospirostan-3,12-dione in glacial acetic acid and adding a few drops of hydrobromic acid in acetic acid thereto. Thereafter an excess of bromine in acetic acid is added dropwise to the solution of sapogenin in acetic acid. During the reaction the temperature is maintained at approximately 20° C. The reaction mixture, after the addition of the bromine thereto, is then kept for a suitable time at room temperature, as for example from four hours to twelve hours. The 2,4,23-tribromo-22-isoallospirostan-3,12-dione is then precipitated by pouring the reaction mixture into water. After filtration, the precipitate is then washed with water and dried to give the tribromo product.

The tribromo compound is then treated with an excess of sodium iodide in solution in acetone to prepare the corresponding 2-iodo-23-bromo-$\Delta^4$-22-isospirosten-3,12-dione. Preferably, for this last reaction the reacting components in the acetone are refluxed for a short period of time, such as three and one-half hours, and thereafter the mixture is either kept at room temperature for a sufficient length of time to complete the reaction, as for example 80 hours, or alternatively the mixture is refluxed for approximately one day and then kept at room temperature for approximately a second day. The solution is then diluted with ether, washed with water, sodium thiosulphate and sodium bicarbonate, and again with water, dried and then evaporated to dryness to give a crystalline residue of 2-iodo-23-bromo-$\Delta^4$-22-isospirosten-3,12-dione. The 2-iodo-23-bromo compound may be then completely dehalogenated as indicated in the above equation by treating the compound with a dehalogenating agent such as zinc dust in acetic acid or alcohol, or Raney nickel in alcohol. In the alternative the iodine alone may be removed to give the corresponding 23-bromo-$\Delta^4$-22-isospirosten-3,12-dione by treatment with a mild reducing agent, such as chromous chloride, sodium sulfite, dimethylaniline or collidine. Thereafter, the 23-bromo-$\Delta^4$-22-isospirosten-3,12-dione may then be treated with the dehalogenating agent to prepare the same compound, namely $\Delta^4$-22-isospirosten-3,12-dione previously described. The alternative steps just referred to are illustrated by the following equation:

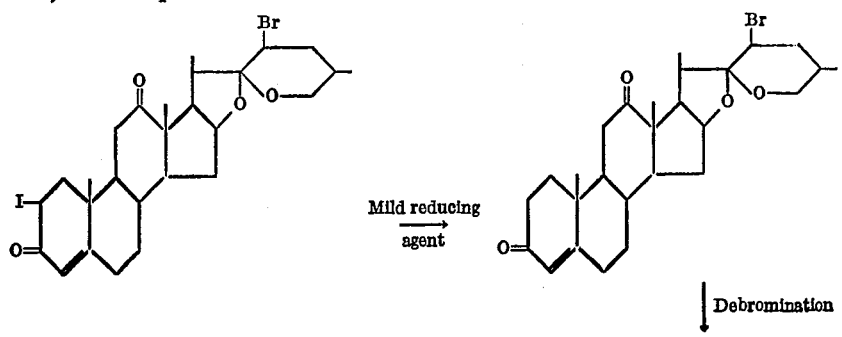

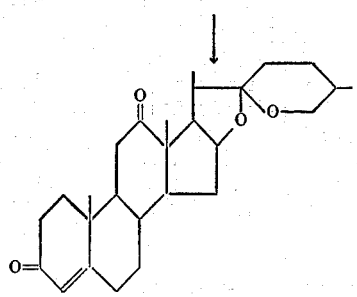

It may be noted that when the bromination to produce the tribromo compound is effected at higher temperatures than that described, namely at temperatures of over 30° C., a certain amount of derivatives brominated at C–11 are produced as would be expected in accordance with the experiments described in United States patent application Serial Number 203,015, filed in the United States Patent Office on December 27, 1950. However, this secondary reaction does not alter the essential method, since a halogen substituent at C–11 is also eliminated in the foregoing described reductions. The $\Delta^4$-22-isospirosten-3,12-dione may be converted in accordance with the present invention to the corresponding 3-acyloxy-$\Delta^{3,5}$-spirostadiene-12-one by reaction with a suitable acylating agent in the presence of a strong acid as for example with a lower aliphatic acid anhydride in the presence of paratoluenesulfonic acid or by reaction with isopropenyl acetate in the presence of an acid catalyst.

Finally, the $\Delta^4$-22-isospirosten-3,12-dione can be catalytically reduced under alkaline conditions to form 11-isospirostan-3,12-dione which in turn may be reduced with sodium borohydride to form the corresponding 22-isospirostan-3α-ol-12-one.

Although the present invention is illustrated by the reaction of sapogenins with the 22-iso configuration, the same reactions are applicable to corresponding 22-normal compounds. It should be noted, however, that in the 22-normal compounds the first two molecules of bromine both add at the 23 position and therefore, the 22-normal equivalent of 2,4,23-tribromo-22-isoallospirostan-3,12-dione, for example, would be 2,4,23,23'-tetrabromo-allospirostan-3,12-dione. An additional mol of bromine must, therefore, be used in the normal series for the polybromination indicated.

The following specific examples illustrate, but are not intended to limit the present invention:

Example I

A solution of 35.4 g. of 23-bromo-22-isoallospirostan-3β-ol-12-one in 1.6 lt. of acetic acid was added drop by drop in the course of 30 minutes to a solution of 11 g. of chromic acid in 6 cc. of water and 165 cc. of acetic acid, maintaining the temperature below 15°. After standing overnight at room temperature, the mixture was poured in water and the precipitate was collected, washed with water and dried at room temperature. Crystallization from acetone gave 23-bromo-22-isoallospirostan-3,12-dione with melting point of 225°–228° C. (dec.) $[\alpha]_D = 0$ (chloroform).

Example II

An excess of bromine (2.51 g. in 25 cc. of acetic acid) was added drop by drop to a solution of 2 g. of 23-bromo-isoallospirostan-3,12-dione in 100 cc. of acetic acid containing 4 drops of a 4-normal solution of hydrobromic acid in acetic acid, maintaining the temperature at 20° C. The mixture decolorized completely at the end of the reaction. After 4 hours at room temperature, the mixture was poured in water and the precipitate was filtered, washed with water and dried, to give crude 2,4,23-tribromo-22-isoallospirostan-3,12-dione with melting point of 175° C. (dec.) $[\alpha]_D - 45°$ (chloroform).

Example III

To a solution of 2.8 g. of 22-isoallospirostan-3,12-dione in 100 cc. of glacial acetic acid were added 5 drops of a 4-normal solution of hydrobromic acid in acetic acid, and then 3.7 g. of bromine in 40 cc. of acetic acid were added drop by drop maintaining the temperature below 22° C. The mixture was kept overnight at room temperature to complete the rearrangement of the 2,2-dibromo configuration into the more stable 2,4-dibromo configuration. It was then poured in water and the precipitate was filtered, washed with water and dried, thus giving 2,4,23-tribromo-22-isoallospirostan-3,12-dione in crude form, melting point 178° C. (dec.) in quantitative yield.

Example IV

A solution of 2.72 g. of crude 2,4,23 - tribromo - 22-isoallospirostan-3,12-dione in 300 cc. of acetone was refluxed during 3 and one-half hours with 9.3 g. of sodium iodide and then the mixture was kept at room temperature during 80 hours. Alternatively, the mixture can be refluxed for 17 hours and then kept at room temperature for only 30 hours. The solution was diluted with ether, well washed with water, sodium thiosulphate, sodium bicarbonate and water, dried over sodium sulphate and evaporated to dryness to give a crystalline residue of 2-iodo-23-bromo-$\Delta^4$-22-isospirosten-3,12-dione. This substance does not have a well defined melting point at temperatures around 150° C. the substance decomposed slowly in a wide temperature range, depending upon the rate of heating. The substance has an ultraviolet absorption maximum at 238 m$\mu$ (log E 4.29), characteristic of the $\alpha,\beta$-unsaturated keto grouping.

Example V

A solution of 2 g. of 2-iodo-23-bromo-$\Delta^4$-22-isospirosten-3,12-dione in 750 cc. of alcohol was refluxed during 6.5 hours with 50 g. of zinc dust. After filtering the separated zinc was well washed with ether and the combined ether and alcohol solutions were washed with water, dried over sodium sulphate and evaporated to dryness. Crystallization from chloroform-methanol yielded $\Delta^4$-22-isospirosten-3-12-dione with a melting point of 238°–240° C. (Kofler), $[\alpha]_D$ +53° (chloroform). It shows an ultraviolet absorption maximum at 238 m$\mu$, log E 4.27 and the infrared spectrum, determined in chloroform solution, shows maxima at 1700 cm.$^{-1}$ (characteristic of the 12-keto group) and at 1676 cm.$^{-1}$ (characteristic of the $\Delta^4$-3-keto group).

Example VI

A solution of 1.81 g. of 2-iodo-23-bromo-$\Delta^4$-22-isospirosten-3,12-dione in 200 cc. of acetone and 50 cc. of dioxane was mixed, under an atmosphere of nitrogen, with a solution of chromous chloride prepared from 15 g. of chromic chloride according to the method described by Rosenkranz, Mancera, Gatica and Djerassi, J. Am. Chem. Soc., 72, 4077 (1950). After keeping the solution at room temperature, for 15 minutes, it was diluted with water and extracted with ether, washed with sodium bicarbonate and water, and concentrated to a small volume *a* until crystallization started. The precipitate was collected and recrystallized from ether to give 23-bromo- $\Delta^4$-22-isospirosten-3-12-dione with a melting point of 236–240° C. (dec.), $[\alpha]_D$ +35° (chloroform), ultraviolet absorption maximum at 238 m$\mu$, log $\epsilon$ 4.26. The deiodination can be carried out with the same results by refluxing the 2-iodo-23-bromo-$\Delta^4$-22-isospirosten-3,12-dione in dioxane solution during 30 minutes with 10% aqueous sodium sulphite solution. In this case, after diluting with water, the mixture was worked up in the same way as described for the chromous chloride method.

*Example VII*

A solution of 8 g. of 23-bromo-$\Delta^4$-22-isospirosten-3,12-dione in 250 cc. of alcohol was refluxed for 7 hours with 25 g. of zinc dust. The mixture was treated as in Example V. After one crystallization from chloroform-methanol, $\Delta^4$-22-isospirosten-3,12-dione was obtained, melting point 237°–239° C., otherwise identical to the compound of Example V.

*Example VIII*

A solution of 1.08 g. of $\Delta^4$-22-isospirosten-3,12-dione in 200 cc. of alcohol containing 100 mg. of potassium hydroxide was shaken during one hour under an atmosphere of hydrogen with 300 mg. of 10% palladium-charcoal catalyst. The equivalent of 1 mol of hydrogen was absorbed. After filtering the catalyst, the solution was evaporated to dryness and the residue was crystallized from chloroform-methanol to yield 22-isospirosten-3,12-dione with a melting point of 204°–207° C. The ultraviolet spectrum shows a band only at 284 m$\mu$, log $\epsilon$ 1.82, characteristic of isolated carbonyl groups. The infrared spectrum, determined in chloroform solution, has a band at 1710 cm.$^{-1}$, characteristic of saturated keto groups at C–3 and C–12 and has no band characteristic of $\alpha,\beta$-unsaturated keto groups.

*Example IX*

A mixture of 250 mg. of $\Delta^4$-22-isospirosten-3,12-dione, 15 cc. of benzene, 40 mg. of p-toluenesulphonic acid and 1 cc. of isopropenyl acetate was slowly concentrated in the course of 4.5 hours to a final volume of 5 cc., adding one additional cc. of isopropenyl acetate at the end of the first hour and then 0.5 cc. at the second and third hours. The mixture was then evaporated to dryness under vacuum, diluted with ether, washed with water, sodium bicarbonate and water, dried and evaporated to dryness. The residue was crystallized from ether-acetone containing one drop of pyridine to yield 3-acetoxy-$\Delta^{3,5}$-22-isospirostadien-12-one. The melting point of this substance varies according to the method used for the determination: 245°–248° C. (capillary); 226°–227° C. (Kofler). It shows an ultraviolet absorption maximum at 234 m$\mu$, log $\epsilon$ 4.02. The infrared spectrum (determined in chloroform) has maxima at 1736 cm.$^{-1}$ (acetate and 1700 cm.$^{-1}$ (12-keto group) and shows no band characteristic of $\alpha,\beta$-unsaturated keto groups.

*Example X*

The enol acetate of Example IX was also obtained by refluxing $\Delta^4$-22-isospirosten-3,12-dione with acetic anhydride in the presence of p-toluenesulphonic acid, and then concentrating the solution during 5 hours to one fifth of its original volume. The product was isolated by the method described in Example IX.

*Example XI*

90 mg. of sodium borohydride were added to a solution of 1.1 g. of 22-isospirostan-3,12-dione in 11 cc. of pyridine and the mixture was left standing for 25 hours at room temperature. After pouring into ice water and acidifying with hydrochloric acid, the precipitate formed was filtered, washed with water and dried on the steam bath. The product thus obtained was dissolved in 33 cc. of absolute methanol and treated with 3.3 cc. of acetic acid and 1 g. of Girard T reagent. The mixture was refluxed for one hour, cooled, neutralized with sodium bicarbonate solution and reacidified with two drops of acetic acid. It was then extracted with ether and the aqueous layer was acidified with concentrated hydrochloric acid and heated on the steam bath during half an hour. After cooling it was extracted with ether and the ether extract was washed with water, sodium bicarbonate solution and water, dried over sodium sulphate, filtered and evaporated to dryness. The residue was digested with hexane and filtered. The product was crystallized from acetone until constant melting point, thus giving 22-isospirostan-3$\alpha$-ol-12-one with melting point 210°–212° C. (in sulphuric acid bath) or 214°–216° C. (Kofler).

We claim:

1. A spirostan-3$\alpha$-ol-12-one of the following formula:

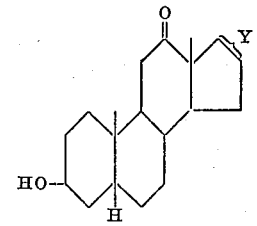

wherein Y is selected from the group consisting of the following:

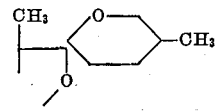

and

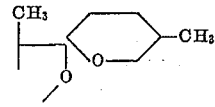

2. A 22-isospirostan-3$\alpha$-ol-12-one of the following formula:

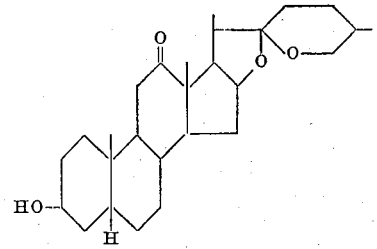

References Cited in the file of this patent

UNITED STATES PATENTS

Re. 23,008    Wagner    June 15, 1948
2,632,008    Gould    Mar. 17, 1952

OTHER REFERENCES

Heyman: J. A. C. S., November 1951, p. 5257.
Marker: J. Amer. Chem. Soc., September 1947, vol. 69, pp. 2171, 2216.
Djerassi: J. Am. Chem. Soc., vol. 73, November 1951, 5513–4.
Marker: J. Amer. Chem. Soc., September 1947, p. 2177.